(12) United States Patent
Diepstraten et al.

(10) Patent No.: US 8,165,149 B2
(45) Date of Patent: *Apr. 24, 2012

(54) MEDIUM RESERVATION WITH CHANNEL SELECTIVITY

(75) Inventors: Wilhelmus Diepstraten, Noord-Brabant (NL); Richard M. van Leeuwen, Zoetermeer (NL); Leo Monteban, Utrecht (NL)

(73) Assignee: Agere Systems Inc., Allentown, PA (US)

( * ) Notice: Subject to any disclaimer, the term of this patent is extended or adjusted under 35 U.S.C. 154(b) by 206 days.

This patent is subject to a terminal disclaimer.

(21) Appl. No.: 12/209,277

(22) Filed: Sep. 12, 2008

(65) Prior Publication Data

US 2009/0010275 A1    Jan. 8, 2009

Related U.S. Application Data

(63) Continuation of application No. 11/039,976, filed on Jan. 21, 2005, now Pat. No. 7,463,645.

(51) Int. Cl.
| | |
|---|---|
| H04L 12/28 | (2006.01) |
| H04L 12/413 | (2006.01) |
| H04L 12/42 | (2006.01) |
| H04L 12/403 | (2006.01) |
| H04B 7/216 | (2006.01) |
| H04B 1/00 | (2006.01) |
| H04B 15/00 | (2006.01) |
| H04B 17/00 | (2006.01) |
| H04J 3/16 | (2006.01) |
| H04J 3/02 | (2006.01) |

(52) U.S. Cl. ........ 370/431; 370/441; 370/437; 370/459; 370/462; 455/63.1; 455/63.3; 455/62

(58) Field of Classification Search .......... 455/450–454, 455/62, 63.1, 63.3, 503, 502, 500; 370/329, 370/431, 441, 437, 459, 462, 464

See application file for complete search history.

(56) References Cited

U.S. PATENT DOCUMENTS

2002/0154653 A1    10/2002    Benveniste
(Continued)

FOREIGN PATENT DOCUMENTS

| GB | 2370 449 A | 6/2002 |
| WO | WO 98/35511 | 8/1998 |

OTHER PUBLICATIONS

Non-Final Office Action; Mailed Dec. 11, 2007 for the corresponding U.S. Appl. No. 11/039,976, filed Jan. 21, 2005.
(Continued)

*Primary Examiner* — Kwang B Yao
*Assistant Examiner* — Adam Duda
(74) *Attorney, Agent, or Firm* — Mendelsohn, Drucker & Associates, P.C.; Steve Mendelsohn

(57) ABSTRACT

A medium-reservation mechanism improves transmission efficiency in a multiple-channel network that includes stations with limited-selectivity receivers. The mechanism employs a medium-request signal that conveys channel information. In this network, stations check the channel information in the medium-request signal to decide whether or not to comply with the medium-request signal. If the channel information identifies the channel that is close to the channel that the station is presently operating on, the station then complies with the medium-request signal. If the channel information identifies a channel other than the channel that the station is presently operating on, the station ignores the medium-request signal.

12 Claims, 7 Drawing Sheets

U.S. PATENT DOCUMENTS

| | | | |
|---|---|---|---|
| 2003/0152058 A1 | 8/2003 | Cimini, Jr. et al. | |
| 2004/0242252 A1* | 12/2004 | Hoeben | 455/503 |
| 2006/0073847 A1 | 4/2006 | Pirzada et al. | |
| 2006/0165114 A1* | 7/2006 | Diepstraten et al. | 370/445 |
| 2009/0010275 A1* | 1/2009 | Diepstraten et al. | 370/445 |

OTHER PUBLICATIONS

Final Office Action; Mailed Apr. 14, 2008 for the corresponding U.S. Appl. No. 11/039,976, filed Jan. 21, 2005.

Advisory Action; Mailed Jul. 9, 2008 for the corresponding U.S. Appl. No. 11/039,976, filed Jan. 21, 2005.

Notice of Allowance; Mailed Aug. 26, 2008 for the corresponding U.S. Appl. No. 11/039,976, filed Jan. 21, 2005.

"Call Admission based on Interference in DS-CDMA Cellular Systems," Tugeu T., C. Ersoy, Proc. of 4th European Personal Mobile Communications Conference, EPMC'2001, Vienna, Austria, Feb. 2001 (4 pages).

* cited by examiner

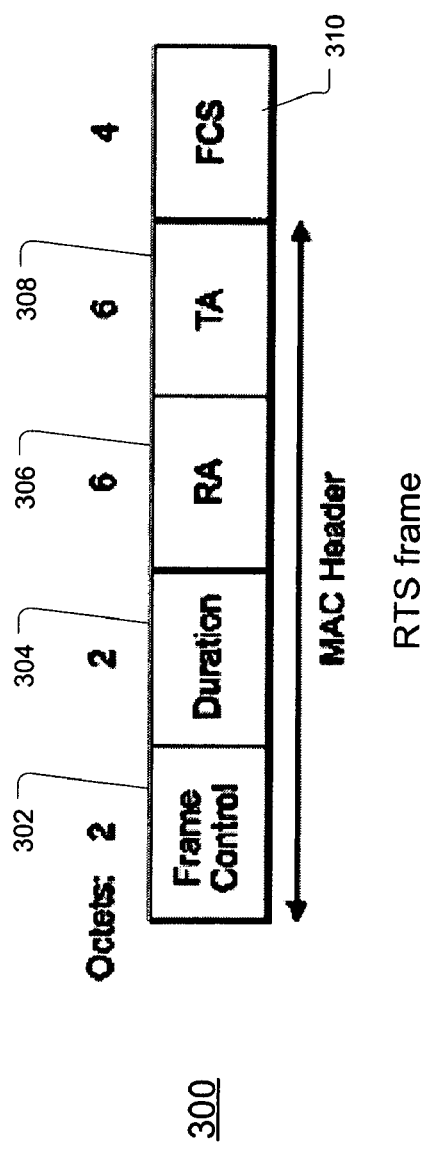
FIG. 3 - Prior Art
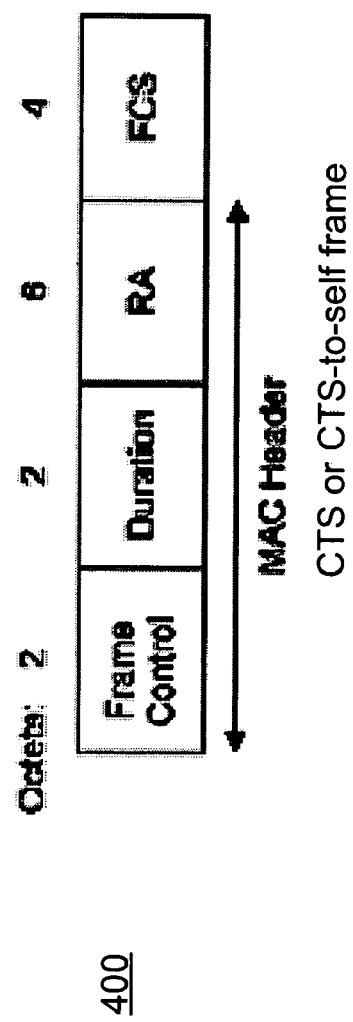
FIG. 4 - Prior Art

MEDIUM RESERVATION WITH CHANNEL SELECTIVITY

CROSS-REFERENCE TO RELATED APPLICATIONS

This is a continuation of co-pending application Ser. No. 11/039,976, filed on Jan. 21, 2005 as the teachings of which are incorporated herein by reference in its entirety.

BACKGROUND OF THE INVENTION

1. Field of the Invention

The present invention relates to wireless communications networks, and more specifically, to medium reservation in multiple channel environments.

2. Description of the Related Art

When multiple communications devices in a network share a common communications medium, some form of medium-reservation protocol is required to support that sharing. Medium-reservation protocols include carrier-sense multiple-access (CSMA), time-division multiple-access (TDMA), frequency-division multiple-access (FDMA), and code-division multiple-access (CDMA). Media include wired (e.g., electrical bus) and wireless (e.g., a band of electromagnetic spectrum) varieties.

CSMA is a medium access control (MAC) protocol in which a device verifies the absence of other traffic on a medium before transmitting on the medium. "Carrier-sense" describes the fact that a transmitter will first listen for a carrier on the medium before attempting to transmit on the medium. This is done in order to attempt to avoid collisions on the medium, such collisions reducing the ability of receivers to properly receive transmission on the medium. "Multiple-access" describes the fact that the protocol is designed to allow multiple devices to share the same medium.

In pure CSMA, a transmitting device does not detect collisions, and a receiving device does not distinguish between collisions and other sources of errors. Instead, if a receiving device properly receives a transmission, the receiver sends an acknowledgement (ACK) to the transmitter. If the transmitter receives no ACK, it backs off for a random period of time, performs carrier sense again, and reattempts the transmission after determining that the medium is no longer busy.

In an attempt to improve upon the performance of pure CSMA, modern networks typically employ one of two common variants of CSMA, namely CSMA with collision detection (CSMA/CD) or CSMA with collision avoidance (CSMA/CA).

Ethernet networks and networks conforming to the IEEE 802.3 standard, for example, are wired networks that employ CSMA/CD. Under CSMA/CD, a transmitting device has the ability to detect collisions on the medium by listening to its own transmissions on the medium and noting any errors that occur. In response to collision detection, a transmitting device will immediately stop transmission and back off for a random interval before again attempting to transmit. The IEEE 802.3 standard is described in more detail in "*IEEE 802.3 Standard for Information technology—Telecommunications and information exchange between systems—Local and metropolitan area networks—Specific requirements—Part 3: Carrier Sense Multiple Access with Collision Detection (CSMA/CD) Access Method and Physical Layer Specifications*," Institute of Electrical and Electronics Engineers (IEEE), 2002, incorporated herein by reference in its entirety.

Networks conforming to the IEEE 802.11 standard, on the other hand, are wireless networks that employ CSMA/CA. Under CSMA/CA, a device that intends to transmit a data frame will first monitor the medium and then transmit the data frame if the medium is free. If the medium is not free, the device will wait until the medium is free, and then back off for a random interval before attempting to transmit. In either case, the device will wait for an acknowledgement that its transmission was successful before proceeding to transmit another data frame. If no acknowledgement is received, the device will retry the transmission. IEEE 802.11 is described in more detail in IEEE Standard 802.11, 1999 (Reaff 2003) Edition, "*Wireless LAN Medium Access Control (MAC) and Physical Layer (PHY) specifications*," Institute of Electrical and Electronics Engineers (IEEE), 2002 (which includes IEEE Std 802.11, 1999 Edition; IEEE Std 802.11a-1999; IEEE Std 802.11b-1999; IEEE Std 802.11b-1999/Cor 1-2001; and IEEE Std 802.11d-2001) (herein "the IEEE 802.11 standard") specifically, sections 7.2.1.1, 7.2.1.2, 9.2.5.4, and 9.2.5.6, incorporated herein in their entirety by reference.

Medium-request signals are an important part of medium reservation. However, in some multiple-channel networks, medium-request signals can create inefficiencies. For example, many present-day mass-produced wireless communications devices have receivers with limited frequency-band selectivity. Such receivers have a limited ability to reject signals from outside their tuned channel or intended frequency band of operation. These receivers will sometimes, therefore, pick up a medium-request signal from a neighboring channel, such neighboring-channel medium-request signal potentially causing an unnecessary pause in communication on the tuned channel.

For example, in a multiple-channel wireless network such as is specified by the IEEE 802.11 standard, a medium-request signal (e.g., a request-to-send (RTS) frame or a clear-to-send (CTS) frame) that is sent by a device on a first channel (e.g., channel 1), can potentially be received by devices on a second channel (e.g., channel 2). The receipt of an RTS frame by devices on the first channel properly reserves the medium of the first channel for transmission by the sending device on the first channel. Unfortunately, in this scenario, it also blocks communication between devices on the second channel. This blocking of transmissions on the second channel can cause a significant drop in transmission efficiency in a multiple-channel network. Furthermore, the IEEE 802.11 standard actually specifies channels that overlap in frequency. Use of these adjacent frequency-overlapping channels is not recommended within the same sub-region of a network; however, spatial overlap of specific channels often occurs on the boundaries between wireless network sub-regions, exacerbating the efficiency issues in those and surrounding areas, depending on the specific protocols in use.

Accordingly, there exists a need for medium-reservation protocols that improve transmission efficiency in multiple-channel environments.

SUMMARY OF THE INVENTION

Problems in the prior art are addressed, in accordance with principles of the present invention, by a medium-reservation mechanism that improves transmission efficiency in a multiple-channel network that includes stations with limited-selectivity receivers. The mechanism employs a medium-request signal that includes channel information. In this network, stations check the channel information in the medium-request signal to decide whether or not to comply with the medium-request signal. If the channel information identifies the channel that a station is presently operating on, then the station complies with the medium-request signal. If the channel information identifies a channel other than the channel that the station is presently operating on, the station ignores the medium-request signal.

One embodiment of the present invention is a communications station operating at a first channel in a multiple-channel network. The station is adapted to (i) receive a medium-request signal, (ii) determine, from information conveyed by the medium-request signal, a channel to be reserved, and (iii) compare the to-be-reserved channel with the first channel, wherein, if the to-be-reserved channel is sufficiently close to the first channel, then the station defers transmissions on the first channel for a specified duration.

Another embodiment of the present invention is a communications station in a multiple-channel network, the station adapted to transmit a medium-request signal conveying information identifying a channel to be reserved.

Another embodiment of the present invention is a method for signal processing at a communications station operating at a first channel in a multiple-channel network, the method including the steps of (i) receiving a medium-request signal, (ii) determining, from information conveyed by the medium-request signal, a channel to be reserved, and (iii) comparing the to-be-reserved channel with the first channel, wherein, if to-be-reserved channel is sufficiently close to the first channel, then the station defers transmissions on the first channel for a specified duration.

Another embodiment of the present invention is a method for reserving a channel in a multiple-channel network, the method including the step of transmitting a medium-request signal, the medium-request signal conveying information identifying a channel to be reserved.

BRIEF DESCRIPTION OF THE DRAWINGS

Other aspects, features, and advantages of the present invention will become more fully apparent from the following detailed description, the appended claims, and the accompanying drawings in which:

FIGS. 3 and 4 depict the formats of an RTS frame (300) and a CTS or CTS-to-self frame (400), respectively, per the IEEE 802.11 base standard.

DETAILED DESCRIPTION

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

General Concept

Figure 1:
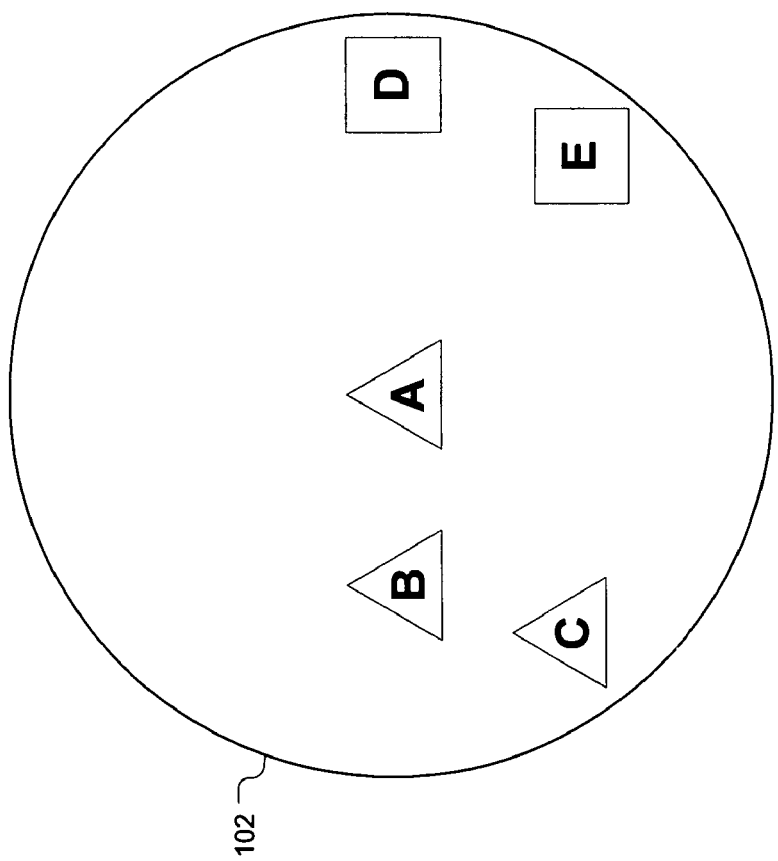
FIG. 1 illustrates exemplary multiple-channel network 100 according to the present invention.

FIG. 1 illustrates exemplary multiple-channel (e.g., wired or wireless) network 100 according to the present invention. The network includes communications stations A, B, C, D, and E. Those stations (e.g., A, B, and C) that communicate using a first channel (e.g., frequency band) are depicted by triangles, while those stations (e.g., D and E) that communicate on a second channel are depicted by squares.

Like networks of the prior art that utilize CSMA/CA-like protocols for medium access (e.g., networks adhering to the IEEE 802.11 standard), if station A desires to reserve the medium (e.g., the frequency band associated with the first channel) for a transmission, it first listens to the medium, and assuming it does not hear any other transmissions on the medium, it backs off for a random interval, and then transmits a medium-request signal.

This medium-request signal is intended to alert the other stations on the same channel (in this case, stations B and C) that station A is interested in transmitting. Upon receiving this medium-request signal, stations B and C respond by deferring any pending transmission for some interval of time (e.g., for a transmission duration indicated by the medium-request signal). Note that, in the network topology depicted by FIG. 1, stations D and E are also within range 102 of station A. Though stations D and E are using a different channel for communication, in many cases, the selectivity of the receivers used in such network stations is limited. As a result, medium-request signals transmitted by station A on the first channel are received by stations D and E on the second channel and misinterpreted by stations D and E as medium-request signals for the second channel. In this case, transmissions on the second channel can effectively be blocked by medium-reservation activities on the first channel causing a drop in overall transmission efficiency on the network.

In the present invention, medium-request signals are enhanced with channel information that identifies the channel that is being reserved (i.e., the channel to which the transmitting station is presently assigned). This channel information can include an actual identifier for the channel that is being used (e.g., "Ch. 1") or it can include, for example, a label identifying the station, the label used as a lookup in a database that stores the characteristics of stations in the network, the active channel for the identified station being one of the stored characteristics. Other arrangements are possible, as would be understood to one skilled in the art. The channel information is then used by a receiving station to determine whether or not it should comply with the medium-request signal. The provision of channel information within the medium-request signal thus improves throughput in multi-channel networks of the present invention relative to those of the prior art, because it avoids unnecessary blocking of communication on adjacent channels.

Figure 2:
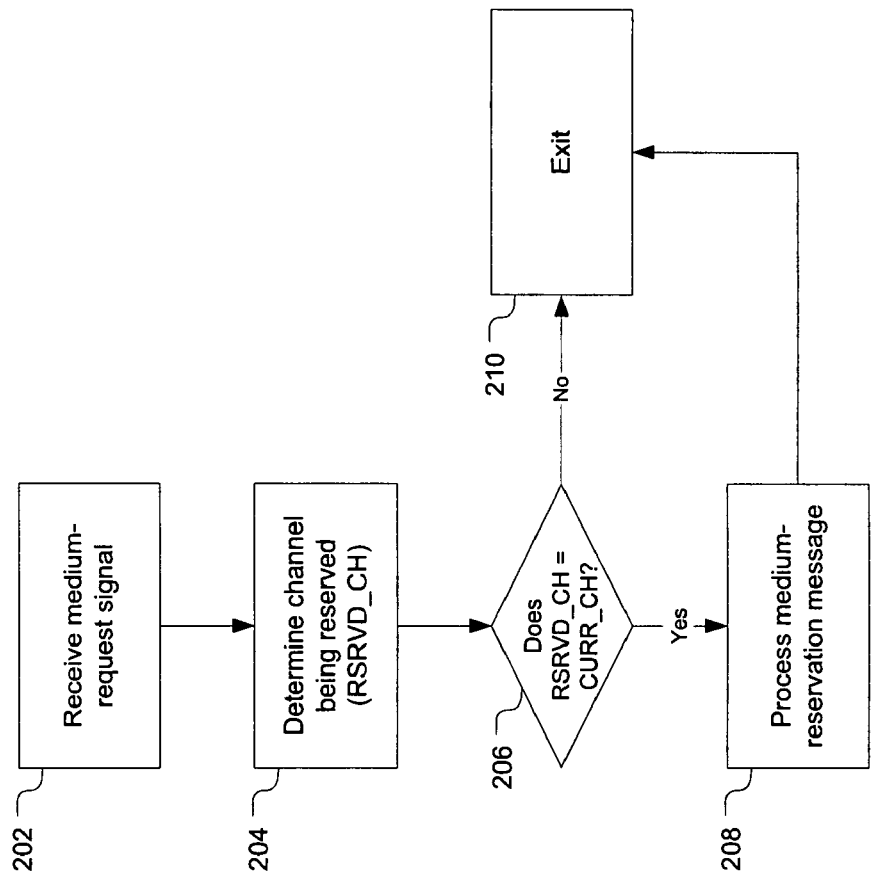
FIG. 2 depicts exemplary process 200 executed by a station of FIG. 1 associated with reception of a medium-request signal according to the present invention.

FIG. 2 depicts exemplary process 200 executed by a station of FIG. 1 associated with reception of a medium-request signal according to the present invention. In step 202, a medium-request signal is received. Then, in step 204, a determination is made of the channel (RSRVD_CH) whose reservation is being requested. Next, in step 206, a test is performed to see if RSRVD_CH is the same as the channel (CURR_CH) that the receiving station is presently operating on. If the channels are not the same, then in step 210, the process concludes. However, if the channels are the same, then in step 208, the receiving station processes the medium-request signal (e.g., it acknowledges the medium-request signal or it simply defers communicating for a particular interval) and then concludes in step 210.

Introduction to IEEE 802.11

Systems that conform to the IEEE 802.11 standard use a short control frame sequence to manage medium reservation. The short control frames that make up this sequence include an RTS frame, a clear-to-send (CTS) frame, and an acknowledge (ACK) frame.

Specifically, under the distributed control function (DCF) of the IEEE 802.11 standard, a device that wishes to send a data frame may first send an RTS frame to the network. The RTS frame includes an address (RA) of the designated recipient of the data frame, as well as a specified duration of time that should be reserved for the transmission of the data frame and the control frames. The recipient station shall reply with a CTS frame that acknowledges the RTS frame and extends the range of the reservation to the neighborhood of the recipient station. Any other device in the network that hears either the RTS or the CTS frame shall refrain from accessing the medium for at least the specified duration. Upon receiving a CTS frame from the recipient, the transmitter sends its data frame and then waits to hear an ACK from the recipient station. If no ACK is received, the transmitter backs off for a random time and starts the procedure over again.

Hidden Node Problem

The CTS frame is an important element of the IEEE 802.11 protocol as it addresses a problem with wireless networks known as the "hidden node problem." The problem exists with any network of three or more stations (a.k.a. nodes). To understand the hidden node problem, first assume that three stations (X, Y, and Z) are arranged along a horizontal line with X on the left, Y in the middle, and Z on the right; and further assume that each station is separated from the other by a distance of f feet and each has a wireless range of f feet. If station X sends an RTS to station Y, station Y will hear it, but station Z will not. However, when station Y responds to station X with a CTS, station Z will hear the CTS and defer any pending transmissions. In the absence of the CTS, there is a chance that station Z might transmit to station Y at the same time that station X transmits to station Y, thus causing a collision.

While the DCF protocol is beneficial, it is somewhat inefficient of bandwidth, since, when it is used, each data frame that is sent is preceded by both an RTS and a CTS frame, and followed by an ACK frame. Thus, an improvement of this method was proposed in a later derivative standard, the improvement being known as "CTS-to-Self."

Following the adoption of the IEEE 802.11*b* standard (now part of the IEEE 802.11 standard), a new IEEE standard 802.11*g* was introduced. The new standard used a form of modulation, orthogonal frequency division multiplexing (OFDM), which was undetectable by the earlier 802.11*b* devices, which devices used direct-sequence spread-spectrum (DSSS) modulation. Thus, in mixed networks, where both 802.11*b* and 802.11*g* devices interoperated, a mechanism was adopted whereby 802.11*g* devices would protect their OFDM transmissions from being corrupted by 802.11*b* transmissions. This mechanism involved an IEEE 802.11*g* standard device sending a CTS-to-self frame using the 802.11*b* modulation format in advance of transmitting its message using OFDM. The CTS-to-self mechanism was more efficient than the earlier RTS/CTS mechanism since it required two short frames (CTS-to-self and ACK) instead of three. IEEE 802.11*g* is described in more detail in IEEE Std 802.11*g*-2003 "*Wireless LAN Medium Access Control (MAC) and Physical Layer (PHY) specifications*," Institute of Electrical and Electronics Engineers (IEEE), 2003 (herein "the IEEE 802.11*g* standard"), specifically, Amendment 4: "*Further Higher Data Rate Extension in the 2.4 GHz Band*," and sections on "*CTS-to-Self and Protection Mechanisms*," sections 9.2.11, 9.10, incorporated herein in their entirety by reference.

802.11 Short Control Frame Formats

FIGS. 3 and 4 depict the formats of an RTS frame (300) and a CTS or CTS-to-self frame (400), respectively, per the IEEE 802.11 and 802.11*g* standards. These short control frames are examples of medium-request signals and/or medium-reservation signaling per the prior art.

RTS frame 300 of FIG. 3 includes frame control field 302, duration field 304, recipient address (RA) field 306, transmitter address (TA) field 308, and frame control sequence (FCS) field 310. These fields are described in more detail in the IEEE 802.11 standard, however, for the purpose of this discussion it is sufficient to understand that duration field 304 specifies how long the transmitter wishes to reserve the medium, RA field 306 is the address of the intended recipient of the transmission that the medium is being reserved for, TA field 308 is the address of the station that is transmitting the RTS frame, and FCS field 310 contains an IEEE 32-bit cyclic redundancy code (CRC) for the frame.

CTS/CTS-to-self frame 400 of FIG. 4 also contains frame control, duration, RA, and FCS fields. Frame control and FCS fields of these frames have similar functions in all three frame formats. In a CTS frame, however, the RA field of the CTS frame is a copy of the TA field of an RTS frame that is received immediately prior to generation of the CTS frame, and the duration field is set to the value of the duration field of the RTS frame minus transmission time of the RTS frame and the interframe interval (see the IEEE 802.11 standard for specifics). In a CTS-to-self frame, the RA field is set to the MAC address of the transmitter of the CTS-to-self frame, and the duration field is set to the anticipated duration of the reservation of the medium for data transmission (similar to the RTS frame duration field setting).

802.11 Exemplary Embodiments

In the following sections, modifications of the above protocols and frame formats are described which illustrate exemplary implementations of the present invention in the context of both the RTS/CTS and CTS-to-self mechanisms of 802.11*b* and 802.11*g* standards. These modifications are of particular interest because they allow new products that implement the improvement of the present invention to co-exist with existing products. Other implementations with respect to these and other standards are also possible within the spirit and scope of the present invention, as would be understood to one skilled in the art.

Modified 802.11 Short Control Frame Formats

Figure 5:
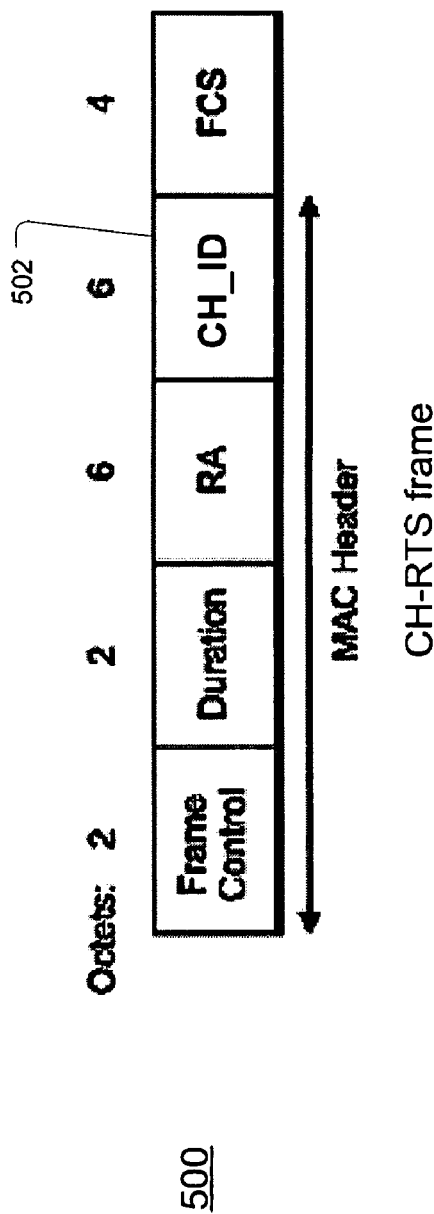
FIGS. 5 and 6 depict exemplary channel-specific short control frame formats according to the present invention.
Figure 6:
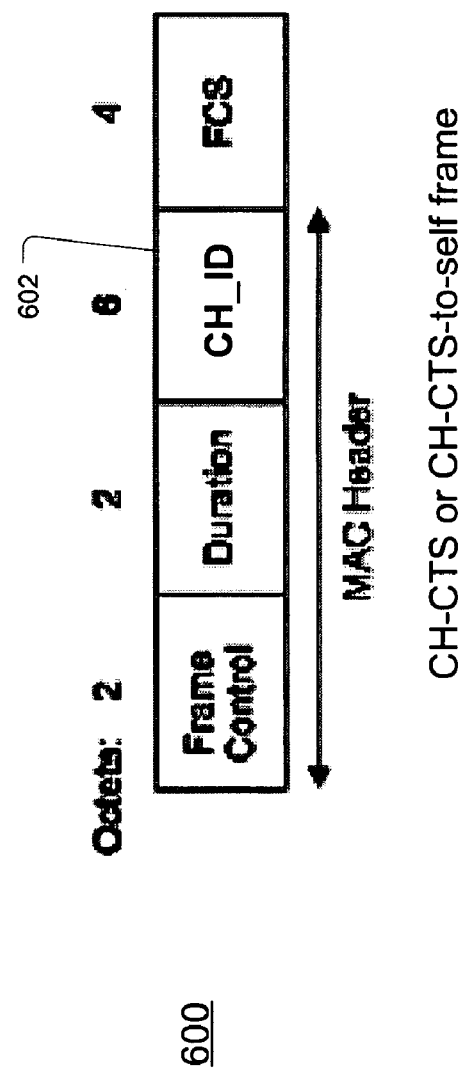

FIGS. 5 and 6 depict exemplary channel-specific short control frame formats according to the present invention. Specifically, the figures illustrate the formats for a channel-RTS (CH-RTS) frame (500), and a channel-CTS (CH-CTS) or channel-CTS-to-self (CH-CTS-to-self) frame (600), respectively. Fields of these channel-specific frames that correspond in both location and name with fields of the corresponding RTS and CTS/CTS-to-self frames of the prior art (as illustrated in FIGS. 3 and 4) have functions that correspond with the functions of those prior art frame fields.

RTS Frame Modifications

FIG. 5 depicts the frame format 500 for an exemplary CH-RTS frame of the present invention. Note that the CH-RTS frame format is the same as the frame format of an RTS frame of the prior art, except that the TA field has been replaced by channel identifier (CH_ID) field 502. The CH_ID field identifies the channel (e.g., which channel of a group of potentially 14 different possible channels in use worldwide) that is being reserved by the CH-RTS frame. The CH_ID identifies the channel while still conforming to the TA field MAC address requirements of the IEEE 802.11 standard and thus provides backward compatibility to that standard. (Under the IEEE 802.11 standard, the MAC address is a concatenation of a 24-bit organization unique identifier (OUI) assigned by the IEEE Registration Authority and a 24-bit extension identifier assigned by the organization that owns the OUI assignment). There are a number of ways to accomplish this compatibility.

One way is to reserve and publish a specific range of 14 MAC addresses to be used exclusively as channel identifiers. None of these addresses will be used in any wireless LAN station as a unit MAC address. This can be accomplished unilaterally by the organization that owns a specific OUI by simply removing those IDs from its corporate address allocation for LAN equipment and publishing these MAC addresses for other organizations to recognize as channel identifiers. Alternatively, the IEEE Registration Authority can control these addresses.

Another way is to define a simple criterion (e.g., a particular pattern for the 24 OUI bits) to be used by a station to decide whether to interpret the CH_ID field as a MAC address or a CH_ID. This approach can be combined with the use of the other bits to identify which of the 14 channels is being used. Other related approaches would be understood to one skilled in the art to be within the scope and intent of the present invention.

CTS and CTS-to-Self Frame Modifications

FIG. 6 depicts frame format 600 for exemplary CH-CTS and CH-CTS-to-self frames of the present invention. The format is the same as the frame format of a CTS/CTS-to-self frame of the prior art, except that the RA field has been replaced with channel identifier (CH_ID) field 602. As in the case of the CH-RTS frame, the CH_ID field identifies the channel that is being reserved by the CH-CTS frame.

Control Frame Processing

To legacy 802.11 stations, the channel-specific short control frames of the present invention will appear identical to legacy 802.11 short control frames, and the CH_ID field, if processed, will be interpreted as a standard MAC address. However, for new stations that support the present invention, the processing is enhanced. For clarity of discussion, both CH-RTS and RTS frames will be defined herein to belong to an RTS class of frames. Similarly, CTS, CH-CTS, CTS-to-self, and CH-CTS-to-self frames will all be defined herein to belong to a CTS class of frames. Operation of stations conforming to the present invention, as well as operation of legacy stations in the context of both the new stations and the modified frames is described below. For clarity, subtleties of duration-field adjustment and special cases associated with processing of frames by a frame-originating station are glossed over in the following discussion. These details are described in the relevant 802.11 standards and are understood by those skilled in the art.

RTS-Class Frame Processing by Legacy Stations

Since the CH_ID field of a CH-RTS frame is at the same location relative to the frame control field as the TA field is in an RTS frame of the prior art, and because the CH_ID conforms to the 802.11 address convention, a legacy station will not be able to distinguish a CH-RTS frame from a legacy RTS frame and it will thus process both identically, yet with a different consequence. Such processing and consequence of RTS-class frame processing by legacy equipment in the context of the present invention is discussed below.

Figure 7:
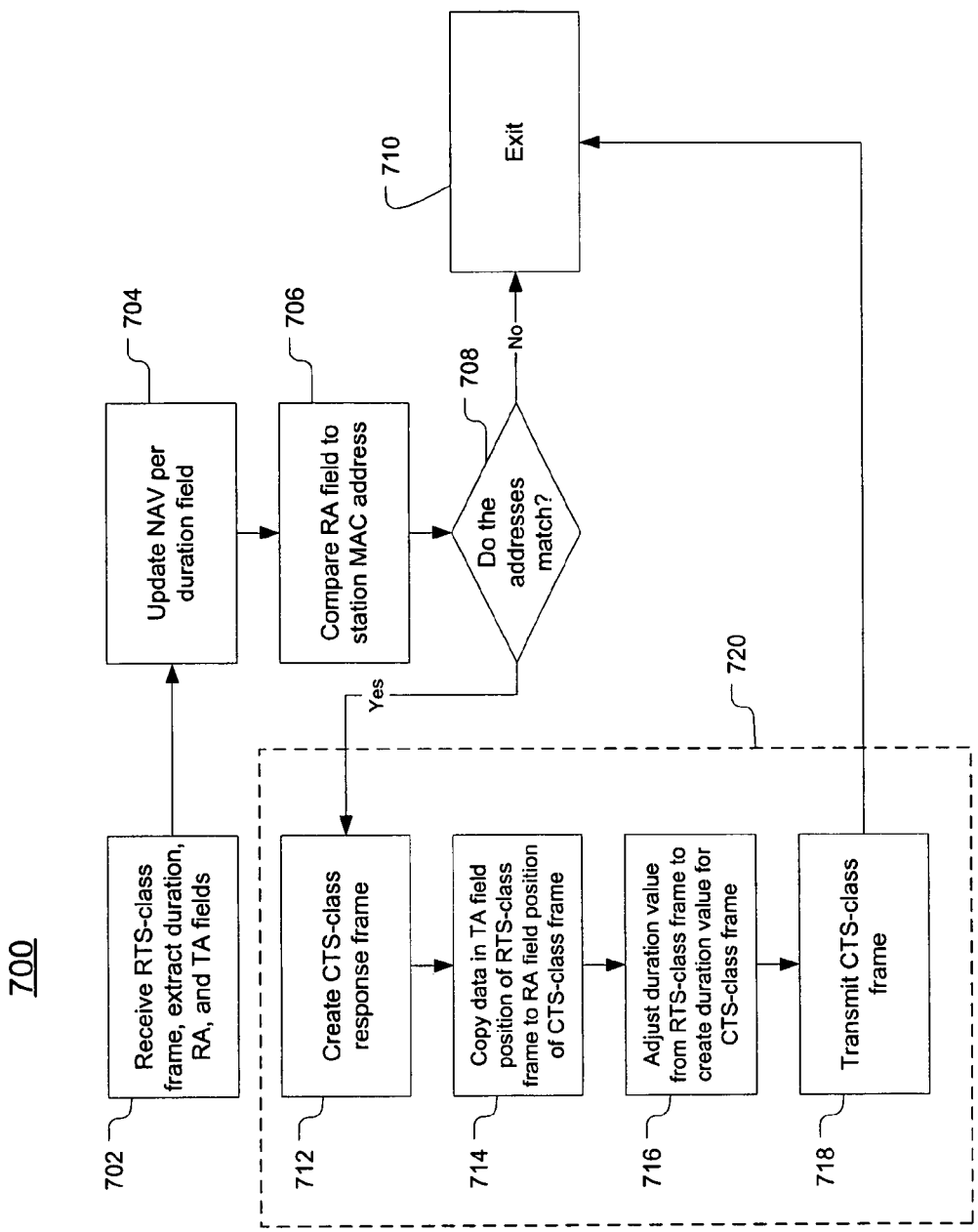
FIG. 7 illustrates exemplary procedure 700 for handling of RTS-class frames by legacy stations.

The processing of RTS-class frames by legacy stations is illustrated by procedure 700 of FIG. 7. In step 702, the legacy station receives an RTS-class frame and the duration, RA, and TA fields are extracted. Next, in step 704, the network allocation vector (NAV) information is updated in the station using information from the duration field. The NAV is an indicator, maintained by each station, of time periods during which transmission onto the wireless medium may not be initiated by the station (independent of whether or not the station's clear channel assessment (CCA) function senses that the medium is busy). Next, in step 706, the recipient address of the received RTS-class frame is compared with the MAC address of the receiving station, and in step 708, a test is performed to see if there is a match. If the addresses do not match, then the procedure concludes in step 710. However, if the addresses do match, then, in step 712, a CTS-class frame is generated in response to the reception of the RTS-class frame. In step 714, the value that is in the position of the TA field (from the legacy station's perspective) is copied into the RA field and in step 716 the value of the duration field of the CTS-class frame is calculated using the value extracted from the duration field of the RTS-class frame. Note that, it is somewhat academic as to whether the frame generated in step 716 is referred to as a CTS frame or a CH-CTS frame since the formats are substantially identical, hence the use of the "class" terminology. However, if an RTS frame is received, then the response will be a CTS frame. On the other hand, if CH-RTS frame is received, then the response will be a CH-CTS frame since what the legacy station extracts from the position in the frame corresponding to the TA field is actually a CH_ID and, this is what gets transmitted in the RA field of the CTS frame that is generated. Finally, in step 718, the CTS-class frame is transmitted and in step 710, the procedure concludes.

As noted above, when a legacy station is the designated recipient of a CH-RTS frame, it responds by executing CTS-class frame generation sub-procedure 720 of FIG. 7 that results in the issuing of a frame that has format 600 of a CH-CTS frame as illustrated by FIG. 6. Thus, a legacy station that is the recipient of a CH-RTS frame will actually respond by transmitting a CH-CTS frame in the format as specified in the present invention. Other legacy stations that hear this (or any other CTS-class frame) will respond by deferring any pending transmissions (per the IEEE 802.11 standard) as discussed in more detail below.

CTS-Class Frame Processing by Legacy Stations

Figure 8:
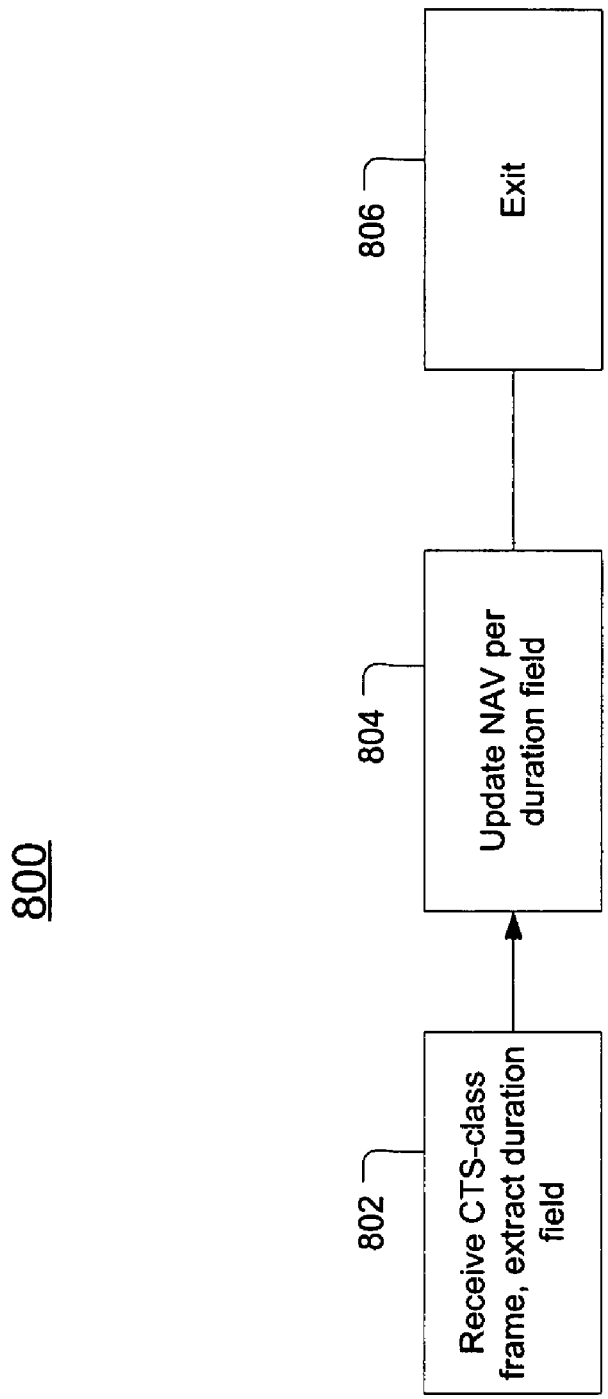
FIG. 8 illustrates exemplary procedure 800 for handling of a CTS-class frames by a legacy station.

The handling of a CTS-class frame by a legacy station includes the following steps as illustrated by procedure 800 of FIG. 8. In step 802, the frame is received and the duration field extracted. In step 804, the duration field value is used to update the NAV information for the receiving station, and in step 806 the procedure concludes.

RTS/CTS-Class Frame Processing by New Stations

Figure 9:
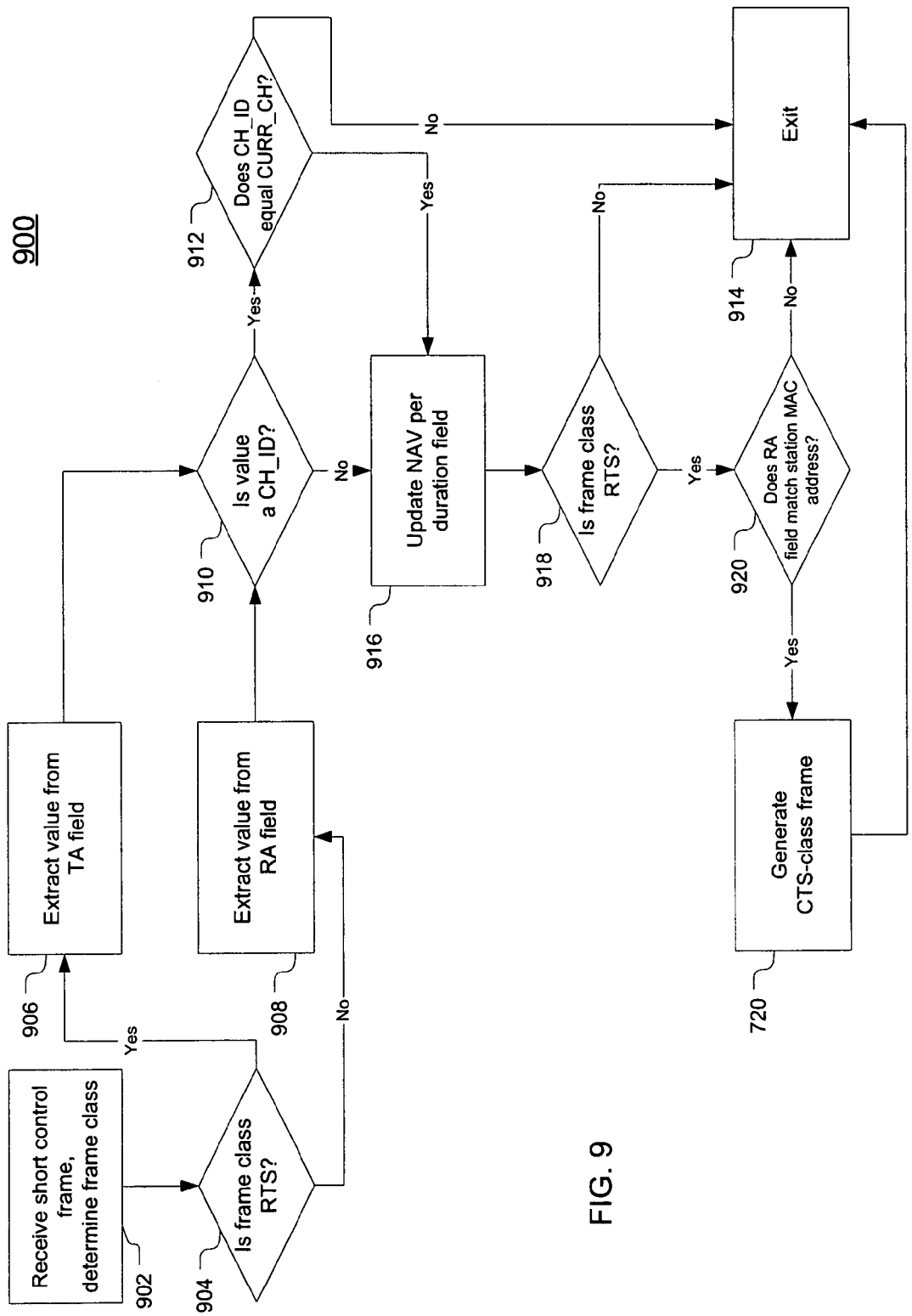
FIG. 9 illustrates exemplary procedure 900 performed by stations of the present invention in handling RTS- and CTS-class frames.

Upon receiving either an RTS- or CTS-class frame, a new station (where "new station" herein is defined as a station that is aware of the enhanced medium-reservation protocol according to the present invention) will execute steps that include those illustrated by procedure 900 of FIG. 9. Procedure 900 is related closely to the combination of procedures 700 and 800 performed by legacy stations, but it is enhanced by an initial test to see if the received frame is intended to reserve the same channel that the receiving station is operating on.

As illustrated in FIG. 9, in step 902, a short control frame is received and its class is determined. Next in step 904, a test is performed to see if the frame is an RTS-class frame. If it is, then, in step 906, the TA field value is extracted; otherwise, the frame is assumed to be a CTS-class frame, and, in step 908, the RA field value is extracted. In either case, in step 910, a test is performed to see if the extracted field's value corresponds to a CH_ID. If it does, then, in step 912, at test is performed to see if the CH_ID matches the channel (CURR_CH) that the receiving station is currently operating on. If it does not, then the procedure concludes in step 914. If, in step 912, CH_ID does match CURR_CH, or if, in step 910, the value in the extracted TA or RA field was determined not to be a CH_ID, then, in step 916, the network allocation vector is updated as a function of the value of the duration field in the received frame. Following this, a test is performed in step 918 to again determine whether the class of the received frame is RTS. If it is not, then the frame is assumed to be a CTS-class frame, and, the procedure concludes in step 914. If it is, then, in step 920, a test is performed to see if the recipient address of the frame matches the MAC address of the receiving station. If it does not, then the procedure concludes in step 914. However, if the addresses do match, then a CTS-class frame is generated according to sub-procedure 720 discussed with respect to FIG. 7 previously, and the procedure then concludes in step 914. Note that procedure 900 incorporates both RTS- and CTS-class frame processing into a single procedure.

Channel Overlap Considerations

An important concept to note regarding channel assignments in the IEEE 802.11 standard is that the channel actually represents the center frequency (e.g., 2.412 GHz for channel 1 and 2.417 GHz for channel 2) that the transceiver within a station uses. There is only a 5 MHz separation between the center frequencies of each channel, and an 802.11 signal occupies approximately 30 MHz of the frequency spectrum. As a result, an 802.11 signal overlaps with several adjacent channel frequencies. This leaves only three channels (channels 1, 6, and 11 in the U.S.) that can be used without causing interference between stations.

In consideration of the above, in certain embodiments of the present invention, it is desirable to allow medium-reservation to span more than a single channel. In other words, if a CH-RTS frame is received and it is not on the exact operating channel of the receiver, but it is on a channel that is close to the operating channel of the receiver, then the receiver may decide to treat the medium-request signal as if it were on the same channel. Stations in this particular embodiment would follow a procedure that is a derivative of the control frame processing procedure 900 of FIG. 9. The derivative procedure is identical to procedure 900 except that the test of step 912 is modified to read "Is CH_ID close to CURR_CH." Here "close" can be defined by some configurable or dynamically determinable parameter for the system.

Control Frame Origination

According to certain embodiments of the present invention, a station that originates a CH-RTS/CH-CTS frame sequence is aware that when it sends a CH-RTS frame, it should expect to get a CH-CTS frame back from the recipient station. It will not, therefore, wait for an RA addressed CTS frame (as is done in the prior art), but instead, it will start its transmission immediately after a CH-CTS frame is received that corresponds to the CH-RTS that was sent. As a further protection, the station originating the CH-RTS frame can check the CH_ID field of a subsequently received CH-CTS to verify that it is, in fact, on the proper channel.

BSSID Embodiments

As discussed previously, there are multiple methods to convey which channel is being reserved by a particular medium-request signal. In 802.11 systems, a basic service set identifier (BSSID) implies a common channel that a group of stations is operating on. In one exemplary embodiment of the present invention, rather than creating a unique set of addresses to use to identify the possible channels in the network, the CH_ID field of the CH-RTS and CH-CTS/CH-CTS-to-self frames can be loaded with the BSSID. If a control frame carries a valid BSSID in the CH_ID field, a receiving station conforming to this BSSID embodiment of the present invention can use this field to determine whether the control-frame was issued by a station within the same basic service set group as the receiving station, and thereby, by inference, assume it is on the same channel as the receiving station.

Since the BSSID also conforms to the IEEE 802.11 standard MAC addressing format, the discussion related to control frame handling with respect to CH_ID in the prior embodiment applies directly to this BSSID embodiment with the qualification that the channel commonality information is carried in, or is derived from the BSSID by the new stations.

The BSSID, like the CH_ID discussed previously, also conforms to the IEEE 802.11 standard MAC addressing format, wherein the individual/group bit is typically set to "individual."

Therefore, so that stations conforming to the present invention can identify a frame that carries the BSSID, the individual/group bit is set to "group" in the value of the BSSID that is loaded to the TA field of the CH-RTS frame or the RA field of the CH-CTS/CH-RTS-to-self frame by the sending station.

In other words, in one BSSID embodiment, if a station conforming to the present invention looks at the TA field of an incoming RTS-class packet and determines that the individual/group bit is set to "group," it can assume that the TA field carries a BSSID value. Similarly, if a station conforming to the BSSID embodiment of the invention looks at the RA field of an incoming CTS-class packet and determines that the individual/group bit is set to "group," it can assume that the RA field carries a BSSID value.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the claims.

While this invention has been described in the context of 802.11 wireless networks, it is equally applicable to other multiple-channel network standards, both formal and informal, of both wireless and wired varieties including, for example, IEEE standards 802.3 and 802.16.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A communications station operating at a first channel in a multiple channel network having a plurality of different channels, the station adapted to:
    receive a medium-request signal;
    extract information explicitly conveyed within the medium-request signal;
    determine, from the extracted information, one of the plurality of different channels to be a requested channel to be reserved, wherein the requested to-be-reserved channel is different from the first channel; and
    compare the requested to be reserved channel with the first channel, wherein:
        if the station determines that the requested to be reserved channel is within a specified group of two or more channels corresponding to a subset of the plurality of different channels, then the station defers transmissions on the first channel for a specified duration as a result of receiving the medium-request signal; and if the station determines that the requested to-be-reserved channel is not within the specified group of two or more channels, then the station does not defer transmissions on the first channel for the specified duration as a result of receiving the medium-request signal.

2. The invention of claim 1, wherein the medium-request signal is received on the first channel.

3. The invention of claim 1, wherein the medium-request signal is received on a channel different from the first channel.

4. The invention of claim 1, wherein the specified duration is explicitly conveyed within the medium-request signal.

5. The invention of claim 1, wherein the multiple channel network substantially conforms to a communications standard that does not explicitly define a medium-request signal that explicitly conveys information identifying a requested channel to be reserved.

6. The invention of claim 1, wherein the multiple channel network substantially conforms to an IEEE 802.11 standard or a related standard.

7. The invention of claim 1, wherein the medium-request signal is a modified version of a legacy control frame according to an IEEE 802.11 standard or a related standard, wherein any difference between the medium-request signal and the legacy control frame is not apparent to a legacy station that conforms to the standard.

8. The invention of claim 1, wherein the multiple channel network employs a carrier sense multiple access (CSMA) scheme as part of its medium access protocol.

9. A method for signal processing at a communications station operating at a first channel in a multiple channel network having a plurality of different channels, the method including the steps of:

receiving a medium-request signal;

extracting information explicitly conveyed within the medium-request signal;

determining, from the extracted information, one of the plurality of different channels to be a requested channel to be reserved, wherein the requested to-be-reserved channel is different from the first channel; and comparing the requested to be reserved channel with the first channel, wherein:

if the station determines that the requested to be reserved channel is within a specified group of two or more channels corresponding to a subset of the plurality of different channels, then the station defers transmissions on the first channel for a specified duration as a result of receiving the medium-request signal; and if the station determines that the requested to-be-reserved channel is not within the specified group of two or more channels, then the station does not defer transmissions on the first channel for the specified duration as a result of receiving the medium-request signal.

10. The invention of claim 9, wherein the multiple channel network substantially conforms to a communications standard that does not explicitly define a medium-request signal that explicitly conveys information identifying a requested channel to be reserved.

11. The invention of claim 9, wherein the multiple channel network substantially conforms to an IEEE 802.11 standard or a related standard.

12. The invention of claim 9, wherein the medium-request signal is a modified version of a legacy control frame according to an IEEE 802.11 standard or a related standard, wherein any difference between the medium-request signal and the legacy control frame is not apparent to a legacy station that conforms to the standard.

* * * * *